(No Model.) 8 Sheets—Sheet 1.
S. Z. DE FERRANTI.
MECHANISM FOR MAKING SPECTACLE FRAMES.
No. 338,340. Patented Mar. 23, 1886.
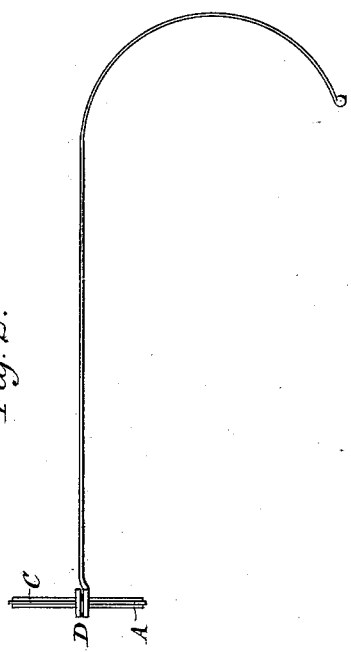
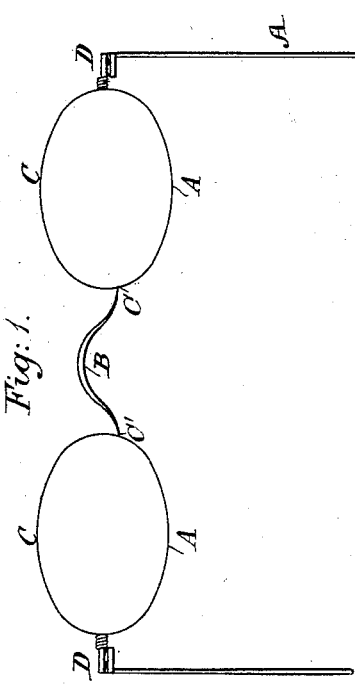
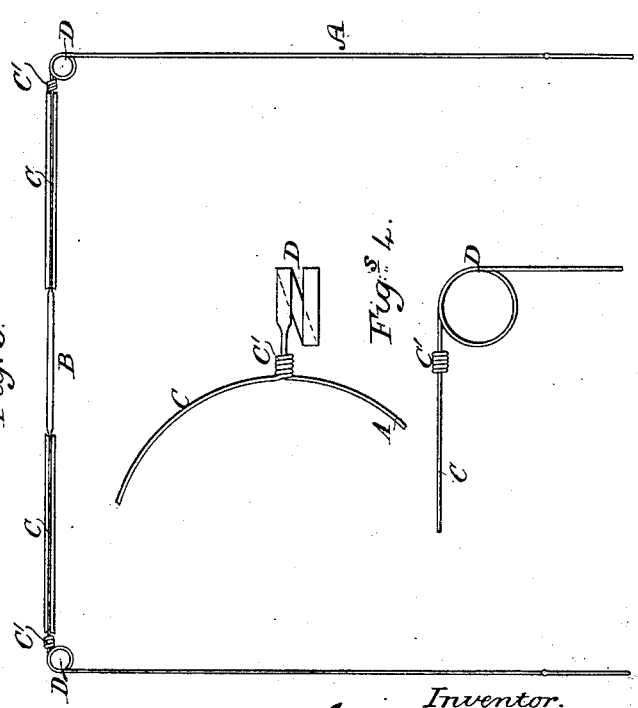
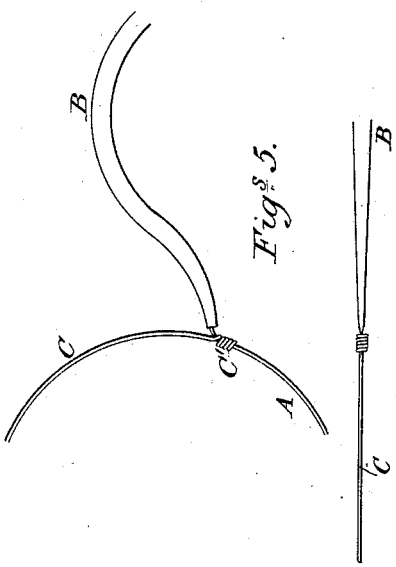

(No Model.) 8 Sheets—Sheet 2.

S. Z. DE FERRANTI.
MECHANISM FOR MAKING SPECTACLE FRAMES.

No. 338,340. Patented Mar. 23, 1886.

(No Model.)
8 Sheets—Sheet 3.
S. Z. DE FERRANTI.
MECHANISM FOR MAKING SPECTACLE FRAMES.
No. 338,340.
Patented Mar. 23, 1886.
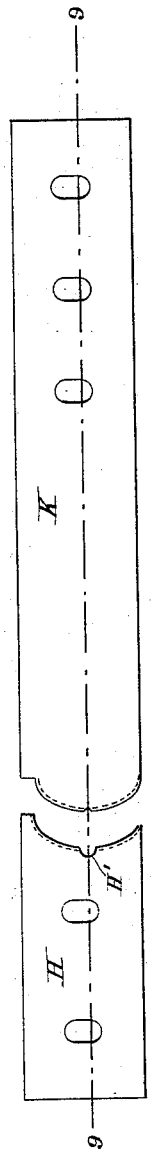

(No Model.) 8 Sheets—Sheet 4.
S. Z. DE FERRANTI.
MECHANISM FOR MAKING SPECTACLE FRAMES.
No. 338,340. Patented Mar. 23, 1886.
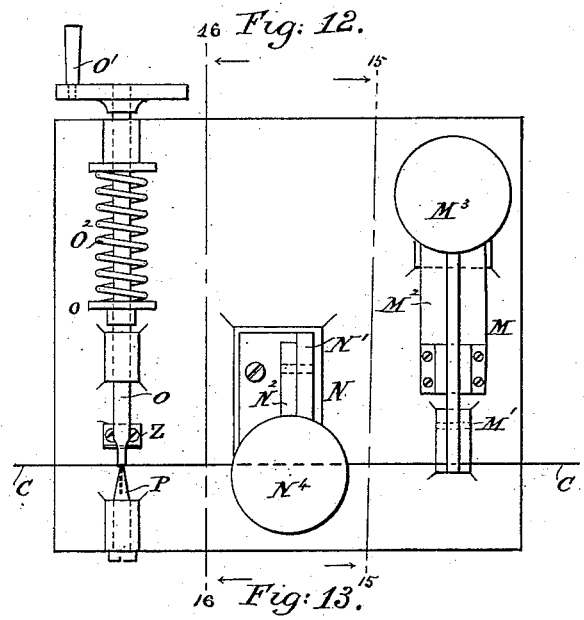
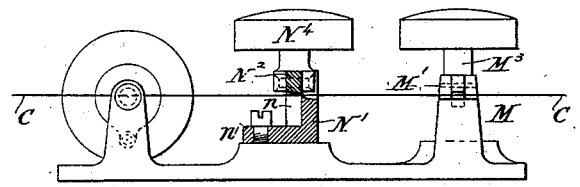
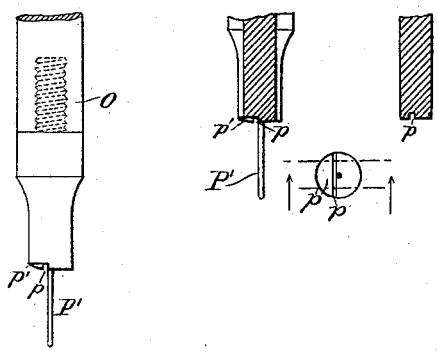
Witnesses
Baltus D. Long
Allan McLane Abert
Inventor
S. Z. de Ferranti,
By Attys
Baldwin Hopkins & Peyton (No Model.) 8 Sheets—Sheet 5.

S. Z. DE FERRANTI.
MECHANISM FOR MAKING SPECTACLE FRAMES.

No. 338,340. Patented Mar. 23, 1886.

(No Model.) 8 Sheets—Sheet 6.

S. Z. DE FERRANTI.
MECHANISM FOR MAKING SPECTACLE FRAMES.

No. 338,340. Patented Mar. 23, 1886.

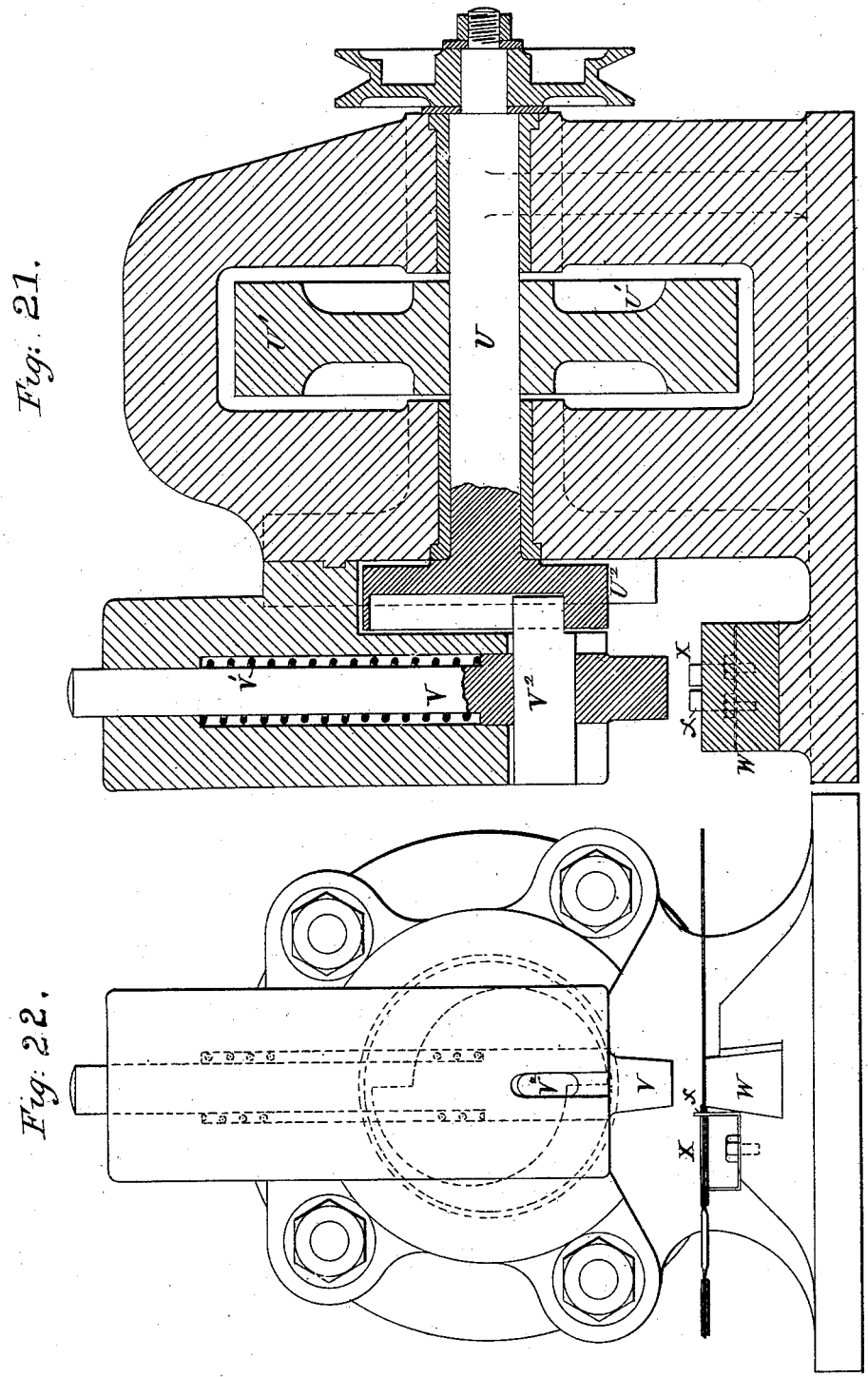

(No Model.) 8 Sheets—Sheet 8.
S. Z. DE FERRANTI.
MECHANISM FOR MAKING SPECTACLE FRAMES.
No. 338,340. Patented Mar. 23, 1886.
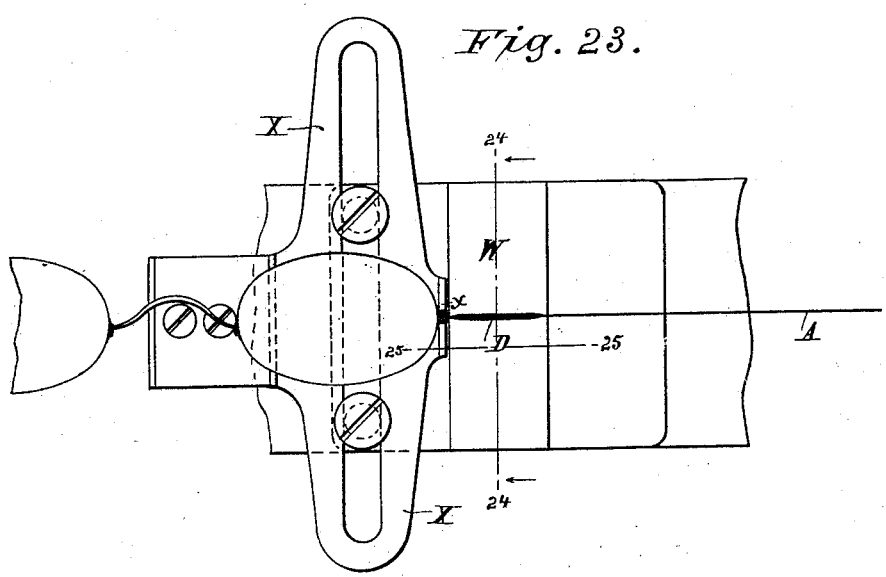
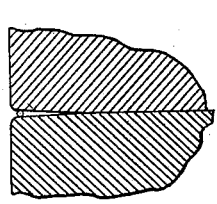
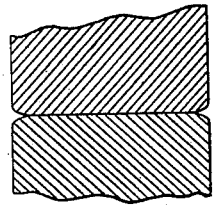
Witnesses. Inventor.

UNITED STATES PATENT OFFICE.

SEBASTIAN ZIANI DE FERRANTI, OF 5 STANWICK ROAD, WEST KENSINGTON, COUNTY OF MIDDLESEX, ENGLAND.

MECHANISM FOR MAKING SPECTACLE-FRAMES.

SPECIFICATION forming part of Letters Patent No. 338,340, dated March 23, 1886.

Application filed July 20, 1885. Serial No. 172,143. (No model.) Patented in England December 8, 1884, No. 16,127.

*To all whom it may concern:*

Be it known that I, SEBASTIAN ZIANI DE FERRANTI, a subject of the Queen of Great Britain, residing at 5 Stanwick Road, West Kensington, in the county of Middlesex, England, have invented certain new and useful Improvements in Apparatus for Making Spectacle-Frames, (for which I have received Letters Patent in Great Britain, No. 16,127, dated December 8, 1884,) of which the following is a specification.

The object of my invention is to provide apparatus by means of which to expedite and cheapen the manufacture of spectacle-frames of wire.

The particular frames which the apparatus is designed to construct are covered by United States Letters Patent No. 327,145, granted to me September 29, 1885.

The frame comprises a main wire, the ends of which form side arms, and which is bent between its side arms to form the nose-piece or bridge and the lower portions of the rims, and two rim-pieces secured by coiling their ends about the main wire. A tube of soft iron or other metal, threaded upon the main wire preparatory to bending it into shape, gives substance to the bridge, so that it may not cut the nose of the wearer. The side arms close to their juncture with the rims are flattened to give increased flexibility.

For a more detailed description of the peculiar construction of the frame reference is made to my above-mentioned patent.

Figure 6:
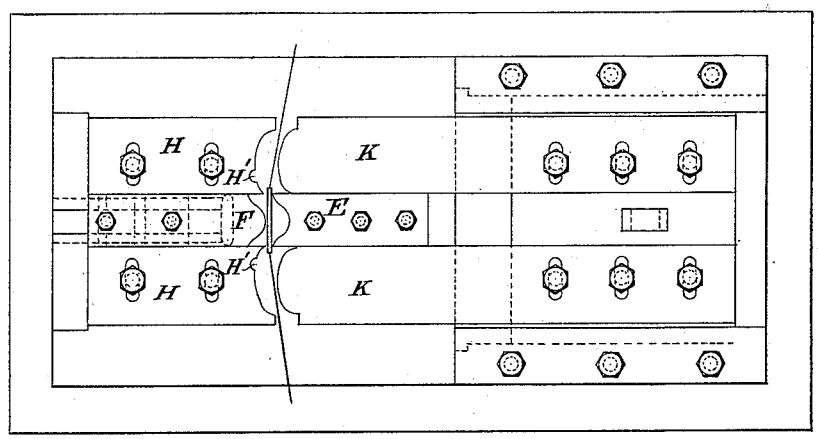
Figure 7:
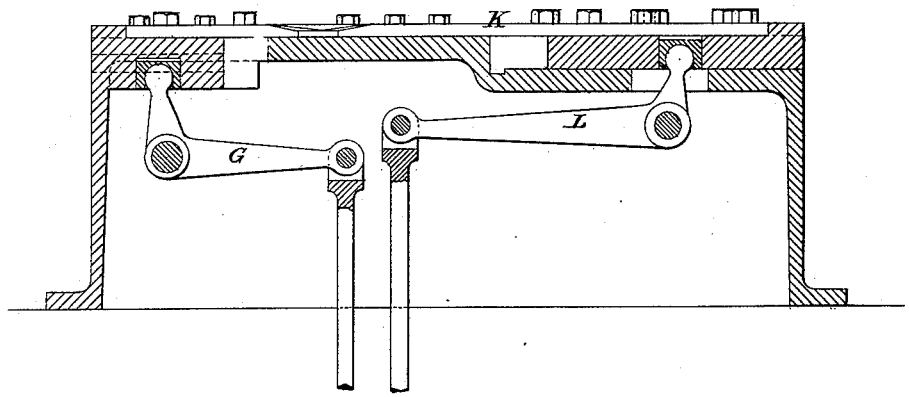
Figure 16:
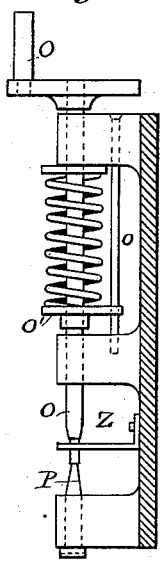
Figure 15:
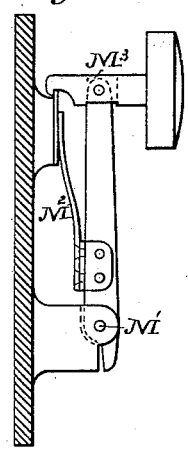
Figure 17:
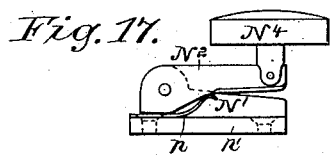
Figure 18:
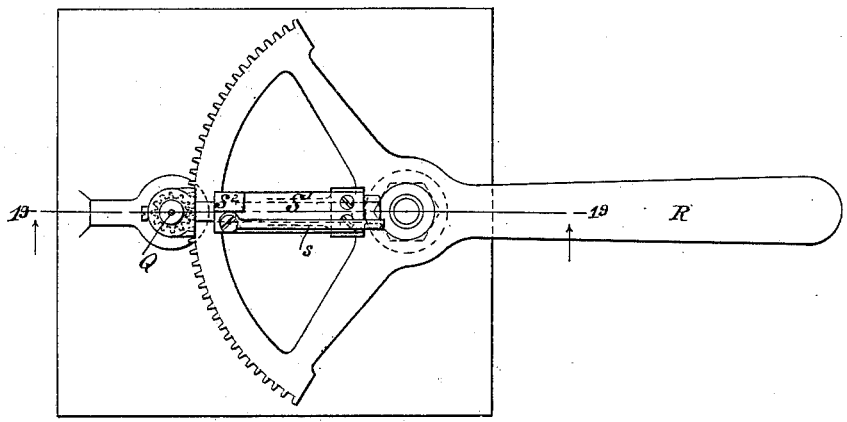
Figure 20:
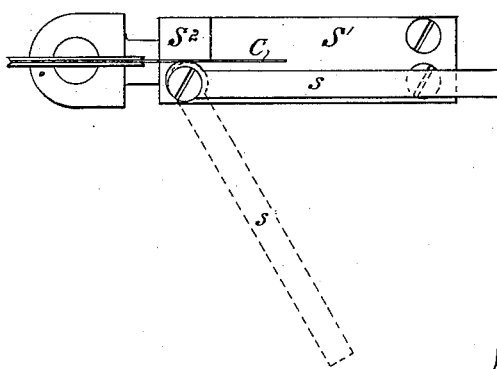
Figure 19:
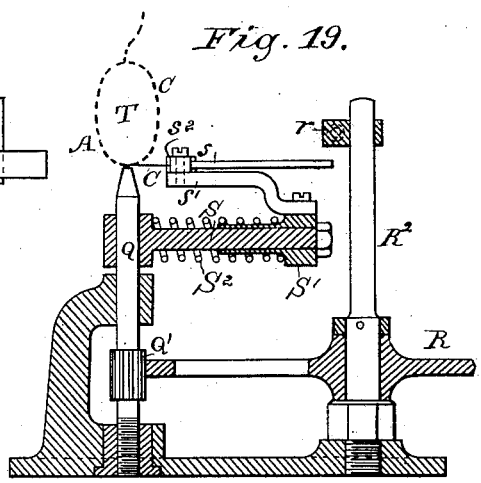

In the accompanying drawings, Figures 1, 2, and 3 show spectacles with frames constructed in accordance with my aforesaid patented improvements, and Figs. 4 and 5 each show in two positions portions thereof to a larger scale. Figs. 6 and 7 represent in plan and vertical section, respectively, apparatus employed in shaping the main wire. Fig. 8 is a plan, and Fig. 9 a section on the line 9 9 of Fig. 8, showing one pair of the dies for shaping the rim portions of the main wire; and Fig. 10 is a plan, and Fig. 11 a section on the line 11 11 of Fig. 10, showing the pair of dies which shape the bridge formed with the main wire. Fig. 12 is a plan of the mechanism for forming the rim-pieces. Fig. 13 is an elevation of the same, partly in section. Fig. 14 shows details of the coiling-spindle of the mechanism for forming the rim-pieces. Fig. 15 shows a side elevation of the clamp of the mechanism for forming the rim-pieces, with the frame in section, on the line 15 of Fig. 12. Fig. 16 is a side elevation of the coiling-spindle, with its frame in section, on the line 16 of Fig. 12. Fig. 17 is an elevation of the cutter for severing the rim-pieces detached. Fig. 18 is a plan view of the mechanism for completing the rims and inclosing the glasses within them. Fig. 19 is a view, partly in elevation and partly in section, on the line 19 of Fig. 18. Fig. 20 is a plan view, on an enlarged scale, of the clamp of the rim-completing mechanism detached. Fig. 21 is a vertical section of the arm-flattening mechanism. Fig. 22 is a front view thereof. Fig. 23 is a plan view, on an enlarged scale, showing the spectacle-carriage and the anvil of the arm-flattening mechanism; and Figs. 24 and 25 are diagrammatic views, on an enlarged scale, showing portions of the hammer and anvil of the arm-flattening mechanism.

The main wire A has the tube B, for giving substance to the bridge threaded onto it, and also has two rim-pieces, C, threaded onto it by means of coils, through which the main wire passes.

The main wire is shaped to the form or approximately to the form of the bridge, and the lower portions of the rims by means of three pairs of dies, as follows:

E is a stationary die, into which the bridge is pressed by the movable die F. A lever, G, with which may be connected a treadle in well-known way, serves to reciprocate the die F.

H H are the stationary dies, and K K the movable dies, for forming the lower portions of the rims. A lever, L, connected with the movable dies K K, serves to simultaneously actuate them. The lever is to be operated by a treadle in well-known way.

H' H' are recesses in the stationary dies H, to accommodate the small coils C' of the rim-pieces C, and thus prevent the coils from being compressed by the dies while the main wire is being shaped. The rim-pieces, each of which is threaded at one end upon the main wire, are afterward shifted to their places close against the bridge.

In shaping the main wire the bridge is first formed by operating the die F, and then the rim portions are formed by moving the dies K.

The apparatus for preparing the rim-pieces C, by coiling one end of each of such pieces, and then cutting off the piece, is as follows: The wire first passes from a supply-roll to a tension-clamp or yielding holder, M, mounted on a suitable frame or bed-plate, and consisting of a lever pivoted at M', near one end, acted upon by a spring, M², attached to its longer end, and serving to press this end upward, and an abutment or stationary jaw of the clamp, to which the lever is attached by its pivot. M³ is a pivoted catch jointed to the end of the longer arm of the clamp-lever and adapted to vibrate vertically, so as to be engaged with or disengaged from a suitable stop by means of its hooked lower end. The clamp may be held in an inoperative position by means of this catch, so that the wire may pass freely into and through the clamp. When the catch is liberated, the wire becomes yieldingly held so that it may be drawn forward under proper tension, first between the jaws of a cutter, N, and then to the spindle O of coiling mechanism. The cutter consists of the stationary lower jaw, N', and upper jaw, N², pivoted at its heel end to the stationary jaw, a spring, n, secured at one end to the cutter-base n', and bearing upward at its opposite end against a movable jaw, and a button, N⁴, secured to and above the outer end of the movable jaw. By striking upon the button and so depressing it the cutter is caused to operate to sever the wire.

The wire-coiling mechanism is as follows: The spindle O reciprocates and rotates in suitable bearings of the base-plate. The crank O' is secured to the rear end of the coiling-spindle, and a coiled spring, O², encircling the spindle between its bearings, acts with a tendency to press forward the spindle, so as to cause it to abut at its front end against a stop, shown as formed by the blunt-pointed cone P. The spring O² presses at its forward end against the disk o, secured to the spindle and sliding upon a guide-rod, o'. The coiling-spindle is reduced in diameter at and near its front end, and passes through a guide-standard, Z. A needle, P', fixed in the forward end of the coiling-spindle and projecting therefrom, enters a corresponding hole in the stop P when the coiling-spindle is projected. When the coiling-spindle is retracted to a sufficient extent, the standard Z serves as a stop to throw off the coil of wire formed at the end of a rim-piece, as will presently be understood. A transverse groove or cross-cut, p, is provided in the end of the coiling-spindle, from side to side thereof, and passing close to the needle. On one side of this cross-cut the spindle is formed with an incline, p', this incline extending from one side of the spindle adjacent to one end of the cross-groove to the opposite side of the spindle and corresponding end of the cross-groove. At the deeper end of the incline the surface of the end of the spindle is cut away to the depth of the cross-groove, as will be made apparent by inspection of the details represented by Fig. 14. The size of the needle P' about corresponds with that of the main wire A, so that the spiral coils formed by twisting the ends of the rim-pieces about this needle may be threaded upon the main wire.

The operation of the apparatus for forming the rim-pieces is as follows: The wire for the rim-pieces being drawn forward through the clamp and cutter, and the spindle O retracted, the end of the wire is engaged with the cross-groove of the spindle and the spindle then released, so that by its advance the end of the wire will be held in the cross-groove by the contact of the spindle with its stop P. Upon now rotating the spindle the wire will pass by way of the incline p' to the needle, and will also clear that portion of the wire extending from the spindle toward the supply-roller, as will be obvious. Three or four revolutions are imparted to the coiling-spindle to complete the coil in the end of the rim-piece, and a length of wire to form a rim-piece is then severed by pressing down the movable jaw N² of the cutter N. These operations are repeated to form the desired number of rim-pieces.

The main wire with its attached rim-pieces having been shaped, as already explained, the rims are completed and the glasses, which are grooved around their edges, secured in them by mechanism, such as next to be described. A vertical tubular spindle, Q, rotates and reciprocates in suitable frame-bearings, and is provided with a long pinion, Q', fast upon it and engaging with a toothed quadrant, R', to which movement is imparted by means of a lever-handle, R, the quadrant and lever being mounted upon a frame-post, R², as will readily be understood. The lower bearing of the spindle Q has a screw-thread cut within it, and there is a corresponding thread upon the lower end of the spindle, so that the spindle as it is turned is also reciprocated endwise. When at work, the spindle rises, and it is lowered after each actuation preparatory to again working it.

A clamp rotating with and capable of reciprocation, so as to move toward or away from the spindle Q is provided, as follows: An arm, S, is fixed upon the spindle near its upper end and projects laterally from it. A reciprocating clamp-carrier or slider, S', upon this arm is pressed outward or away from the spindle by a spring, S². The clamp proper consists of a cam-lever, s, pivoted to an arm, s', secured to the slider, and provided with an offset or stop, s², between which and the cam-lever the free end of a rim-piece is to be clamped. When the cam-lever is swung into the position represented by dotted lines, Fig. 20, the rim-piece is released.

The operation of this rim-completing mechanism is as follows: A side arm or projecting end of the main wire A is inserted into the tubular spindle until its rim portion is brought close to the pointed upper end of the spindle. A glass being placed in position between the rim portion of the main wire and the rim-piece, and the end of this rim-piece carried around the main wire and adjusted in the clamp, as clearly represented in Fig. 19, the spindle is rotated. When a sufficient number of turns have been given to the spindle to cause the hitherto free end of the rim-piece to become coiled about the main wire, and at the same time draw the rim closely about the glass, the cam-lever is elevated until it strikes a stop, $r$, which trips the clamp, thus releasing the end of the rim-piece. The surplus wire at the end of the rim-piece is then nipped off by hand, completing the rim. The other rim of the frame remains to be completed in the same way.

The mechanism for flattening the side arms at D D is as follows: A shaft, U, mounted in a suitable frame, has fast to its opposite ends a fly-wheel, U', and a cam-wheel, $U^2$. The cam-groove of this wheel is formed as plainly shown by dotted lines, Fig. 22. A spring-actuated trip-hammer, V, slides vertically and is guided in suitable ways. A spring, V', acts with a tendency to move the hammer downward. A flattened pin, $V^2$, passes through the hammer near its lower end. This flattened pin works in guide-slots, and at its inner end is operated upon by the cam-wheel. The hammer is lifted and dropped twice at each revolution of the cam-wheel, as will readily be understood, so as to be moved away from and brought toward the anvil W. A sliding carriage, X, in which the spectacle-frames are to be placed to be operated upon by the hammer, is provided with a rest, $x$, to hold the side arm, which is to be operated upon, close to the rim from which it springs. The carriage is shown as provided with a longitudinal slot with which engage guide pins or screws secured to the base of the apparatus. The under surface or face of the hammer at its front is curved or inclined, (see Fig. 24,) in order that the side arm may be gradually flattened to the desired extent, and the opposite sides of the hammer-face are curved or inclined, (see Fig. 25,) in order that the flattened portion of the side arm may gradually merge in the rounded portion of the wire. The face of the anvil is shown as provided with inclines or curves corresponding to those with which the face of the hammer is provided; but it is not absolutely essential that both the hammer and the anvil should have such inclines. In operation it will be understood that the side arm, which is to be flattened at D, (the side arm at this time is in the same plane with the glass,) is held upon the carriage, from the rest $x$ of which it projects over the anvil. The carriage is now moved into position to carry the side arm toward the back of the anvil, and it is gradually flattened to the required extent.

After the side arms are flattened it only remains to coil the flattened portions D, and to bend the outer ends of the side arms to complete the spectacles.

I claim as of my own invention—

1. The combination, substantially as set forth, of the stationary die E, the movable die F, its actuating-lever, the stationary dies H H, the movable dies K K and their actuating-lever, whereby the main wire is operated upon, first to shape the bridge, and then to shape the rim portions at opposite sides of the bridge, as described.

2. The combination of the stationary die E, the movable die F, the stationary dies H H, provided with the recesses H' H', and the movable dies K K, substantially as and for the purpose set forth.

3. The combination of the rotating and reciprocating coiling-spindle having the cross-cut and incline at its outer end, the stop against which the outer end of the coiling-spindle abuts, the needle projecting from the coiling-spindle and entering a hole in the stop, the spring acting on the spindle, and a yielding clamp from which the wire passes under tension to the coiling-spindle, substantially as and for the purpose set forth.

4. The combination of the coiling mechanism, the yielding clamp from which the wire passes to the coiling mechanism, and the cutter between the clamp and coiling mechanism for severing the rim-pieces from the wire after coiling their ends, substantially as and for the purpose set forth.

5. The combination of the rotating and reciprocating tubular spindle into which the side arm of a frame passes, the fixed arm of the spindle, and the spring-actuated clamp carried by said fixed arm and movable toward and away from the spindle, for engaging the end of the rim-piece, substantially as and for the purpose set forth.

6. The combination of the rotating and reciprocating tubular spindle into which the side arm of a frame passes, the fixed arm of the spindle, the spring-actuated slider on this arm, the clamp carried by the slider for engaging the end of a rim-piece, and the clamp-tripping stop, substantially as and for the purpose set forth.

7. The combination of the reciprocating hammer, the anvil, and the sliding carriage for the spectacles having the rest for the side arm, as and for the purpose set forth.

SEBASTIAN ZIANI DE FERRANTI.

Witnesses:
 THOMAS LAKE,
 W. J. NORWOOD,
*Both of 17 Gracechurch Street, London, E. C.*